(12) United States Patent
Srivastava et al.

(10) Patent No.: US 8,324,793 B2
(45) Date of Patent: Dec. 4, 2012

(54) RARE EARTH DOPED LUMINESCENT MATERIAL

(75) Inventors: Alok Mani Srivastava, Niskayuna, NY (US); Holly Ann Comanzo, Niskayuna, NY (US); William Winder Beers, Chesterland, OH (US); László Balázs, Godollo (HU); István Károly Deme, Budapset (HU); Gopi Chandran Ramachandran, Bangalore (IN); Katalin Toth, Budapest (HU); Nagaveni Karkada, Bangalore (IN); Swarnagowri Addepalli, Bangalore (IN)

(73) Assignee: General Electric Company, Niskayuna, NY (US)

( * ) Notice: Subject to any disclaimer, the term of this patent is extended or adjusted under 35 U.S.C. 154(b) by 109 days.

(21) Appl. No.: 12/886,014

(22) Filed: Sep. 20, 2010

(65) Prior Publication Data

US 2012/0068592 A1 Mar. 22, 2012

(51) Int. Cl.
*H01J 61/44* (2006.01)
(52) U.S. Cl. .................. 313/486; 362/235; 252/301.4 R
(58) Field of Classification Search .................. None
See application file for complete search history.

(56) References Cited

U.S. PATENT DOCUMENTS

| | | | |
|---|---|---|---|
| 5,686,022 A | 11/1997 | Murayama et al. | |
| 5,985,174 A | 11/1999 | Heo | |
| 6,402,987 B1 | 6/2002 | Srivastava et al. | |
| 6,436,313 B1 | 8/2002 | Srivastava et al. | |

FOREIGN PATENT DOCUMENTS

| | | |
|---|---|---|
| EP | 1602703 A1 | 12/2005 |
| EP | 2056364 A1 | 5/2009 |
| JP | 2003055654 A | 2/2003 |
| WO | 0243106 A1 | 5/2002 |

OTHER PUBLICATIONS

Search Report and Written Opinion from corresponding PCT Application No. PCT/US2011/043534 dated Sep. 22, 2011.
Zhang et al., "25.1: Improvement on Longevity of Blue Phosphor for PDP Applications", vol. XXXII, pp. 414, Jun. 3, 2001.
Keith H Butler; "Fluorescent Lamp phosphors"; Technology and Theory,The Pennsylvania State University, University Park (USA) (1980),Library of Congress Cataloging in Publication Data,pp. 79-80.

*Primary Examiner* — Tracie Y Green
(74) *Attorney, Agent, or Firm* — Mary Louise Stanford

(57) ABSTRACT

A luminescent material includes an aluminate phosphor of formula I $$A_{1+x}Mg_{1+y}Al_{10+z}O_{17+x+y+1.5z}:Eu^{2+}, R^{3+}, \text{where}$$
$$0 \leq x \leq 0.4, 0 \leq y \leq 1 \text{ and } 0 \leq z \leq 0.2.$$

A is selected from Ca, Ba, and Sr and combinations thereof. The aluminate phosphor is doped with a rare earth ion ($R^{3+}$), which exists in stable multi-valence states in the luminescent material. $R^{3+}$ is selected from the group consisting of $Sm^{3+}$, $Yb^{3+}$, $Tm^{3+}$, $Ce^{3+}$, $Tb^{3+}$, $Pr^{3+}$ and combinations thereof. Phosphors of formula I may be blended with other blue, yellow, orange, green, and red phosphors to yield white light phosphor blends. A lighting apparatus including such a luminescent material is also presented. The light apparatus includes a light source in addition to the luminescent material.

25 Claims, 2 Drawing Sheets

RARE EARTH DOPED LUMINESCENT MATERIAL

BACKGROUND

The invention relates generally to phosphors, specifically phosphors for use in fluorescent lamps. More particularly, the invention relates to europium and manganese activated aluminate phosphors doped with rare earth elements.

A phosphor is a luminescent material that absorbs radiation energy in a portion of the electromagnetic spectrum and emits energy in another portion of the electromagnetic spectrum. Phosphors of one important class are crystalline inorganic compounds of very high chemical purity and of controlled composition to which small quantities of other elements (called "activators") have been added to convert them into efficient fluorescent materials. With the right combination of activators and inorganic compounds, the color of the emission can be controlled. Most useful and well-known phosphors emit radiation in the visible portion of the electromagnetic spectrum in response to excitation by electromagnetic radiation outside the visible range.

Aluminate phosphors such as barium-magnesium-aluminate (BAM) are widely used as the blue-emitting component of the phosphor blends in most fluorescent lamps intended for white light generation. Such phosphors generally have the formula $(Ba, Ca, Sr)MgAl_{10}O_{17}$. These phosphors may contain various activator ions, which impart the phosphor property. For example, a divalent europium ($Eu^{2+}$) activated phosphor absorbs ultraviolet (UV) emission (i.e., exciting radiation) from the mercury plasma in a fluorescent lamp and emits blue visible light. Furthermore, a divalent manganese ($Mn^{2+}$) activated BAM phosphor produces blue-green emission in fluorescent lamps.

Despite its wide use, BAM is notorious for its shortcomings in brightness and maintenance, particularly in those applications involving exposure to high ultraviolet (UV) and vacuum ultraviolet (VUV) fluxes. These phosphors suffer from poor efficacy and lumen maintenance, specifically under high wall load conditions, which is usually found in compact fluorescent lamps (CFLs), and linear fluorescent lamps. Efficacy is the luminosity per unit of input electric power (measured in units of lumens/watt). Lumen maintenance is the ability of the phosphor to resist radiation damage over time. Because of these shortcomings, the blue BAM emission is reduced at a significantly faster rate over time than the emissions of the other color components in the blends or pixels. This results in a loss of lumens and a color shift in the overall light output.

It is believed that the poor efficacy and lumen maintenance are caused by UV-induced visible absorption centers, such as "color centers" and other lattice defects. Color centers are believed to be caused by lattice defects in the lattice that trap an electron or a hole, as described on pages 79-80 of K. H. Butler, *Fluorescent Lamp Phosphors*, Penn State University Press, 1980, incorporated herein by reference. It has been established that in many fluorescent lamp phosphors, the color centers are created by the 185 nm radiation emitted by the mercury plasma. The color centers induce absorption of the exciting radiation anywhere from the deep UV to the infrared region of the spectrum. Thus, these centers can degrade phosphor brightness by either absorbing the visible phosphor emission or by absorbing a part of the 254 nm mercury exciting radiation.

Therefore, it would be desirable to obtain a BAM phosphor with an improved efficacy and lumen maintenance.

BRIEF DESCRIPTION

Briefly, in one aspect, the present invention relates to a luminescent material including an aluminate phosphor of formula I

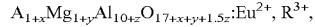

$$A_{1+x}Mg_{1+y}Al_{10+z}O_{17+x+y+1.5z}:Eu^{2+}, R^{3+},$$

where $0 \leq x \leq 0.4$, $0 \leq y \leq 1$ and $0 \leq z \leq 0.2$. A is selected from Ca, Ba, and Sr and combinations thereof. The aluminate phosphor is doped with a rare earth ion ($R^{3+}$), which exists in stable multi-valence states in the luminescent material. $R^{3+}$ is selected from the group consisting of $Sm^{3+}$, $Yb^{3+}$, $Tm^{3+}$, $Ce^{3+}$, $Tb^{3+}$, $Pr^{3+}$ and combinations thereof. Phosphors of formula I may be blended with other green, yellow, orange, blue and red emitting phosphors to yield white light phosphor blends.

In another aspect, the present invention relates to a luminescent material including an aluminate phosphor of formula II $$(LaMgAl_{11}O_{19})_a(A_{1+x}Mg_{1+y}Al_{10+z}O_{17+x+y+1.5z})_{1-a}:Eu^{2+}, R^{3+}$$

where $0 \leq a \leq 0.3$; and $0 \leq x \leq 0.4$, $0 \leq y \leq 1$ and $0 \leq z \leq 0.2$. A is selected from Ca, Ba, and Sr and combinations thereof. The aluminate phosphor is doped with a rare earth ion ($R^{3+}$) selected from the group consisting of $Sm^{3+}$, $Yb^{3+}$, $Tm^{3+}$, $Ce^{3+}$, $Tb^{3+}$, $Pr^{3+}$ and combinations thereof.

In yet another aspect, the present invention relates to a lighting apparatus. The lighting apparatus includes a light source; and a luminescent material radiationally coupled to the light source, and containing an aluminate phosphor of formula I or formula II.

DRAWINGS

These and other features, aspects, and advantages of the present invention will become better understood when the following detailed description is read with reference to the accompanying drawings, wherein.

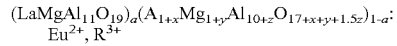

Figure 2A:
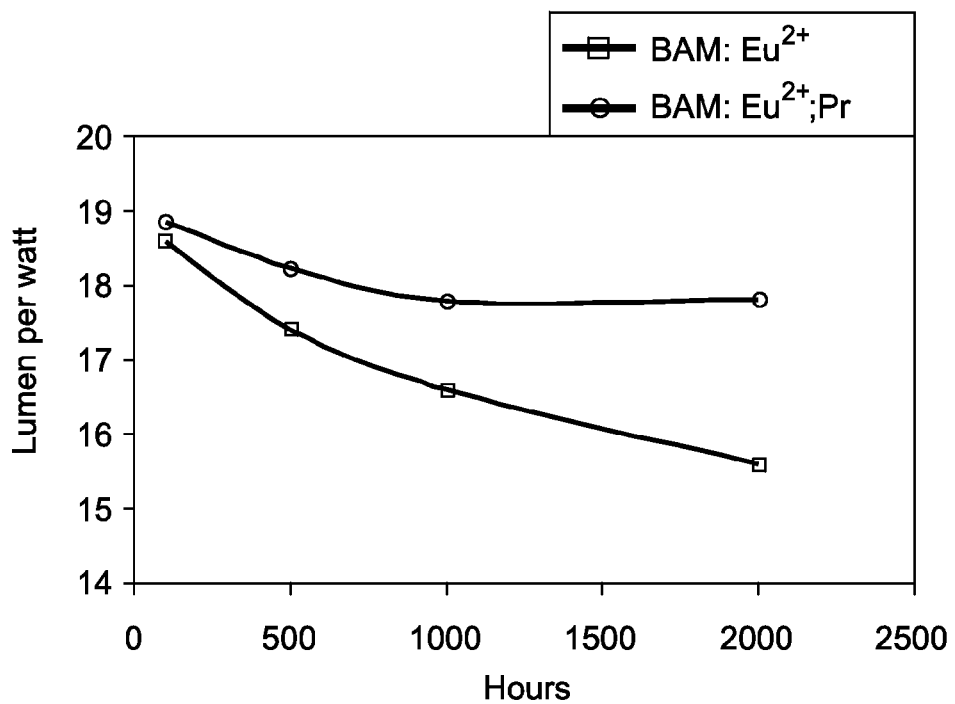
FIG. 2A shows comparative lumen maintenance data of BAM:$Eu^{2+}$,$Pr^{3+}$ (example 1)
Figure 2B:
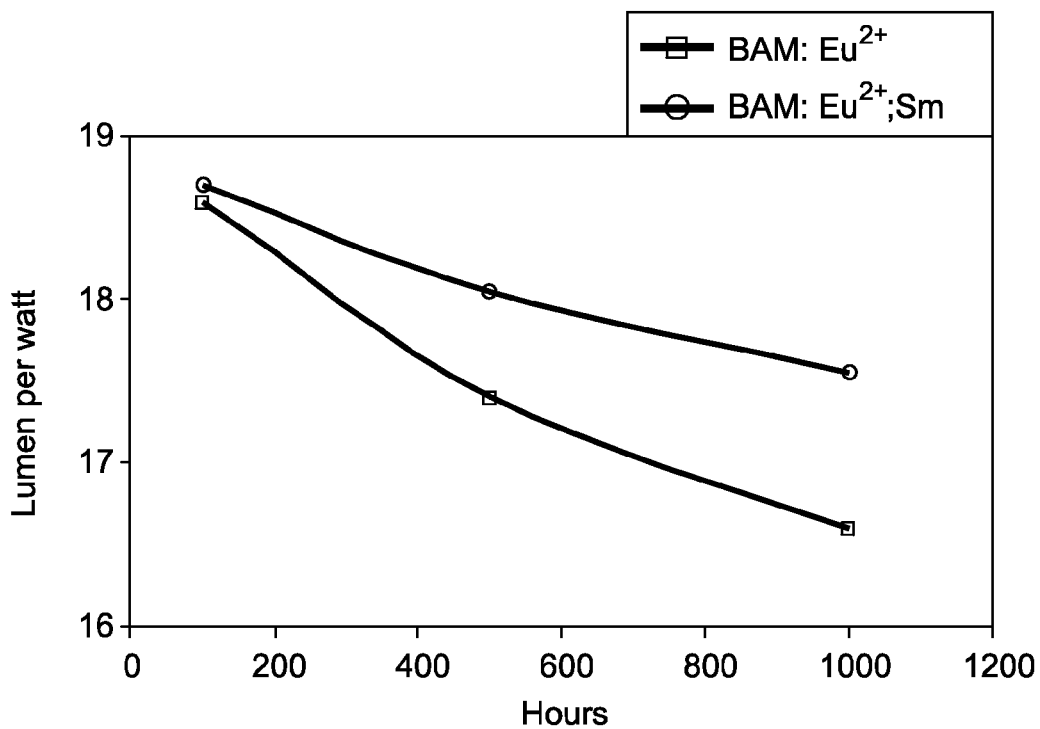

FIG. 2B shows comparative lumen maintenance data of BAM:$Eu^{2+}$,$Sm^{3+}$ (example 2)

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and the claims that follow, the singular forms "a", "an" and "the" include plural referents unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be".

As used herein, the term "phosphor" or "phosphor material" may be used to denote both a single phosphor composition as well as a blend of two or more phosphors compositions. In one embodiment, the phosphor contains at least an aluminate phosphor, such as BAM or manganese-doped BAM (BAMMn). In some embodiments, the phosphor contains a blend of blue, red, yellow, orange and green phosphors. The blue, red, yellow, orange and green phosphors are so called or known after the color of their light emission.

According to one embodiment of the invention, a luminescent material including an aluminate phosphor is provided. The aluminate phosphor has following formula: $A_{1+x}Mg_{1+y}Al_{10+z}O_{17+x+y+1.5z}$:$Eu^{2+}$, where x, y and z represent mole fractions of A, Mg and Al. A is selected from Ca, Ba, and Sr and combinations thereof. In one embodiment, A is barium. In other embodiments, ranges of x, y and z are defined as $0 \leq x \leq 0.4$, $0 \leq y \leq 1$ and $0 \leq z \leq 0.2$. Particularly, x is less than about 0.2, and z is less than about 0.1. In one particular embodiment, the phosphor of formula I is $BaMgAl_{10}O_{17}$:$Eu^{2+}$, and in another embodiment, the phosphor of formula I is $BaMg_2Al_{10}O_{18}$:$Eu^{2+}$.

In aluminate phosphor, the europium ions ($Eu^{2+}$) substitute for a portion of the A ions. The above formula may also be written down as $(A_{1-u}Eu_u)_{1+x}Mg_{1+y}Al_{10+z}O_{17+x+y+1.5z}$, where u represents mole fraction of europium ions. In some embodiments, the amount of europium ions is given as $0.05 \leq u \leq 0.5$, and in some specific embodiments, $0.1 \leq u \leq 0.15$.

In some embodiments, the aluminate phosphor is further activated with manganese ions ($Mn^{2+}$) and may also be referred as manganese-doped aluminate phosphor. Manganese ions substitute for a portion of magnesium ions. In these embodiments, the phosphor has a formula as $A_{1+x}Mg_{1+y}Al_{10+z}O_{17+x+y+1.5z}$:$Eu^{2+}$, $Mn^{2+}$, or $(A_{1-u}Eu_u)_{1+x}(Mg_{1-v}Mn_v)_{1+y}Al_{10+z}O_{17+x+y+1.5z}$, where x, y and z represent mole fractions of A, Mg and Al; u and v represent mole fraction of europium ions and manganese ions, respectively. A is selected from Ca, Ba, and Sr and combinations thereof. In some embodiments, the amount of manganese ions is given as $0 \leq v \leq 0.5$.

In some other embodiments, the luminescent material further includes another aluminate $LaMgAl_{11}O_{19}$ along with the aluminate of above formula $A_{1+x}Mg_{1+y}Al_{10+z}O_{17+x+y+1.5z}$:$Eu^{2+}$. In one embodiment, the luminescent material includes aluminate phosphor of formula: $(LaMgAl_{11}O_{19})_a(A_{1+x}Mg_{1+y}Al_{10+z}O_{17+x+y+1.5z})_{1-a}$:$Eu^{2+}$, where a represents mole fraction of ($LaMgAl_{11}O_{19}$) and defined as $0 \leq a \leq 0.3$ and x, y and z represent mole fractions of A, Mg and Al and defined as $0 \leq x \leq 0.4$, $0 \leq y \leq 1$ and $0 \leq z \leq 0.2$. A is selected from Ca, Ba, and Sr and combinations thereof. In another embodiment, the luminescent material includes manganese-doped aluminate phosphor of formula: $(LaMgAl_{11}O_{19})_a(A_{1+x}Mg_{1+y}Al_{10+z}O_{17+x+y+1.5z})_{1-a}$:$Eu^{2+}$, $Mn^{2+}$, where a represents mole fraction of ($LaMgAl_{11}O_{19}$) and defined as $0 \leq a \leq 0.3$. In certain embodiments, range of a is given as $0 \leq a \leq 0.2$.

While not wishing to be bound by any theory of operation, the present inventors believe that poor lumen maintenance in aluminate phosphors is caused by UV (185 nm and 254 nm)-induced absorption centers (also referred to as "color centers") and other lattice defects. "Color centers" are caused by lattice defects that trap an electron or a hole, which are created by exciting radiation whose wavelength are shorter than the band gap of the material. In several fluorescent lamp phosphors, the 185 nm radiations that are emitted of mercury plasma can excite the phosphor across the band gap. The electron (in the conduction band) or a hole (in valence band) may be trapped by a defect, called color center, in the crystal lattice of the phosphor. The color centers may degrade the phosphor performance by absorbing the visible emission of luminescent centers or competing with the luminescent centers for the exciting radiation whose wavelength is 200 nm or more, for example 254 nm radiation of the mercury plasma. Some lattice defects in ionic crystals which are responsible for a decrease in efficacy and lumen maintenance, may trap both electrons and holes.

According to the embodiments of the present invention, the phosphor efficacy and lumen maintenance may be improved by doping the phosphor with suitable ions such as rare earth ions, which preferentially trap the charge carriers generated by a damaging component of the exciting radiation. That is, the above aluminate phosphor is additionally doped with a suitable trivalent rare earth ion. The rare earth ions usually have a higher charge carrier (i.e., electron and/or hole) capture cross section than the lattice defects, and thus act as alternative charge carrier (electron or hole) trapping centers to the lattice defects. These alternative charge carrier trapping centers improve the phosphor efficacy and lumen maintenance by preventing a large number of charge carriers from reaching the lattice defects and forming color centers or other defects which negatively impact on the phosphor efficacy and lumen maintenance. Without a trapped charge carrier, the lattice defect does not act as a color center and is therefore unable to absorb the visible light generated by the phosphor and is unable to absorb the 254 nm exciting radiation from the mercury plasma. Thus, the rare earth ions decrease the number of color centers or other defects that negatively impact on the phosphor efficacy and lumen maintenance.

Preferably, the sole intended function of the rare earth ions is to trap charge carriers in a host lattice or material preferentially to the defects. However, the rare earth ions may perform other intended functions in the phosphor, if desired.

Thus, in one embodiment, the luminescent material includes an aluminate phosphor of formula I: $A_{1+x}Mg_{1+y}Al_{10+z}O_{17+x+y+1.5z}$:$Eu^{2+}$, $R^{3+}$, where R is a rare earth ion. In another embodiment, the luminescent material includes a manganese-doped aluminate phosphor of formula: $A_{1+x}Mg_{1+y}Al_{10+z}O_{17+x+y+1.5z}$:$Eu^{2+}$, $Mn^{2+}$, $R^{3+}$. In yet another embodiment, the luminescent material includes an aluminate phosphor of formula II: $(LaMgAl_{11}O_{19})_a(A_{1+x}Mg_{1+y}Al_{10+z}O_{17+x+y+1.5z})_{1-a}$:$Eu^{2+}$, $R^{3+}$. In yet another embodiment, the luminescent material includes a manganese-doped aluminate phosphor of formula $(LaMgAl_{11}O_{19})_a(A_{1+x}Mg_{1+y}Al_{10+z}O_{17+x+y+1.5z})_{1-a}$:$Eu^{2+}$, $Mn^{2+}$, $R^{3+}$.

In one embodiment, the rare earth ion is a trivalent ion ($R^{3+}$). Non-limiting examples of such trivalent rare earth ions are samarium, ($Sm^{3+}$), ytterbium ($Yb^{3+}$), thulium ($Tm^{3+}$), cerium ($Ce^{3+}$), terbium ($Tb^{3+}$), and praseodymium ($Pr^{3+}$). In another embodiment, the rare earth ion exists in stable multivalence states in the luminescent material. In particular embodiments, the rare earth ion exhibits at least two stable valence states, such as divalent and trivalent states or trivalent and tetravalent states. These valence states are described in below embodiments. Depending on their stable valence states, the rare earth ion may provide an electron-trapping center or a hole-trapping center and may also be referred to as an "electron trapping dopant ion" or a "hole trapping dopant ion," respectively.

In a first preferred embodiment of the present invention, the preferred electron trapping dopant ions include trivalent rare earth ions which also exhibit a stable divalent valence state in the host material. Suitable examples of such rare earth ions are samarium ($Sm^{3+}$), ytterbium ($Yb^{3+}$) and thulium ($Tm^{3+}$). The host material, such as the aluminate phosphor, may contain one or more of such rare earth ions. These rare earth ions substitute for a portion of the A ions. The concentration of rare earth ions is preferably above the unavoidable or background concentration normally present in the phosphor and may vary between about 50 ppm (parts per million) to about 10,000 ppm. In certain embodiments, the concentration of rare earth ion may vary between about 2500 ppm to about 7,000 ppm. For example, the concentration of the $Sm^{3+}$ ions is about 5000 ppm.

The above trivalent rare earth ions in the host lattice constitute electron trapping centers because the rare earth ions assume a stable divalent valence state by capturing or trapping an electron: $R^{3+}+e^-=R^{2+}$, where $R^{3+}$ and $R^{2+}$ represent the rare earth ion in trivalent and divalent valence state, respectively, and $e^-$ is the free electron in the conduction band. Thus, the ability to form a stable divalent valence state contributes to the electron capture cross section of the rare earth ions. Incorporation of the rare earth ions in the trivalent state preferentially traps the electrons created by the 185 nm exciting radiation compared to oxide ion vacancies in the aluminate lattice, because the rare earth ions have a higher electron capture cross section than the oxide ion vacancies. The electron capture by the electron trapping dopant ions diminishes the concentration of the color centers in the phosphor lattice. Hence, a higher luminous output may be obtained in the doped aluminate phosphors due to reduced probability of color center formation. The defects responsible for the color centers are described as oxide ion vacancies. However, other defects may also be responsible for the color centers.

In a second preferred embodiment of the present invention, the preferred hole trapping dopant ions include trivalent rare earth ions which also exhibit a stable tetravalent valence state in the host material. Non limiting examples of such rare earth ions are cerium ($Ce^{3+}$), terbium ($Tb^{3+}$) and praseodymium ($Pr^{3+}$). The host material may contain one or more of such rare earth ions.

The trivalent rare earth ions in the phosphor lattice constitute hole trapping centers because the rare earth ions assume a stable tetravalent valence state by capturing or trapping a hole: $R^{3+}+h^+=R^{4+}$, where $R^{3+}$ and $R^{4+}$ are the rare earth ion in the trivalent and tetravalent valence states, respectively, and $h^+$ is the hole in the valence band. Thus, the ability to form a stable tetravalent valence state contributes to the hole capture cross section of the dopant ions. Incorporation of the dopant ions in the trivalent state preferentially traps the holes created by the 185 nm exciting radiation compared to the hole-trapping defect in the aluminate lattice, because the rare earth ions have a higher hole capture cross section than the hole trapping defects. The hole capture by the dopant ions diminishes the concentration of the defect centers in the host lattice. Hence, a higher luminous output may be obtained in the doped aluminate phosphors due to reduced probability of color center formation.

In a third preferred embodiment of the present invention, the host material contains both electron and hole trapping ions of the first and second embodiments, respectively. Since the 185 nm exciting radiation creates a plurality of electron-hole pairs, the simultaneous presence of electron and hole capturing ions can greatly diminish the formation of electronic defects in the host lattice of the aluminate phosphor. Thus, the phosphor of the third preferred embodiment contains at least one trivalent rare earth ion which also exhibits a stable divalent valence state in the host material, such as $Sm^{3+}$, $Yb^{3+}$ and $Tm^{3+}$, and at least one trivalent rare earth ion which also exhibits a stable tetravalent valence state in the host material, such as $Ce^{3+}$, $Tb^{3+}$ and $Pr^{3+}$.

In the first, second and third preferred embodiments, the charge carrier trapping dopant ions were described as trivalent rare earth ions. However, any other ions, which preferentially trap charge carriers to minimize or eliminate the effects of the lattice defects, may be used instead of the trivalent rare earth ions. For example, Ti, or Nb ions may be used in addition to or instead of the trivalent rare earth ions as the electron trapping dopant ions and V ions may be used in addition to or instead of the trivalent rare earth ions as the electron or hole trapping dopant ions, depending on the oxidation state that the ions assume in the host lattice.

Aluminate phosphors, as discussed above, may be produced using any known ceramic powder method, such as a liquid phase method or a solid-state method. Typically, the method includes mixing or combining starting materials, for example elemental oxides, carbonates and/or hydroxides, for the production of aluminate phosphor. Other starting materials may include nitrates, sulfates, acetates, citrates, or oxalates. Alternately, coprecipitates of the rare earth oxides could be used as the starting materials for the rare earth elements.

In one exemplary process, the above discussed aluminate phosphors can be produced by a dry or a wet method and fired in air or under a reducing atmosphere at from, e.g., 1000 to 1600° C. A fluxing agent may be added to the mixture before or during the step of mixing. This fluxing agent may be $AlF_3$, $NH_4Cl$ or any other conventional fluxing agent, such as a fluoride of at least one metal selected from the group consisting of terbium, aluminum, gallium, and indium. A quantity of a fluxing agent of less than about 20, particularly less than about 10, percent by weight of the total weight of the mixture is adequate for fluxing purposes.

Oxygen containing starting compounds of the constituents (Ba, Mg, Al, Eu, etc.) of the aluminate phosphor may be mixed together by any mechanical method including, but not limited to, stirring and blending. The oxygen containing starting compounds may be combined and pulverized together in a ball mill, a hammer mill, or a jet mill. The mixing may be carried out by a wet milling especially when the mixture of the compounds is to be made into a solution for subsequent precipitation. If the mixture is wet, it may be dried first before being fired under a reducing atmosphere at a temperature from about 900° C. to about 1700° C., or from about 1000° C. to about 1600° C., for a time sufficient to convert all of the mixture to the final composition.

Another embodiment is a lighting apparatus that includes a luminescent material radiationally coupled to a light source. As used herein, the term "radiationally coupled" means that the elements are associated with each other so that at least part of the radiation emitted from one is transmitted to the other. As discussed in above embodiments, the luminescent material contains an aluminate phosphor of formula I or formula II.

Figure 1:
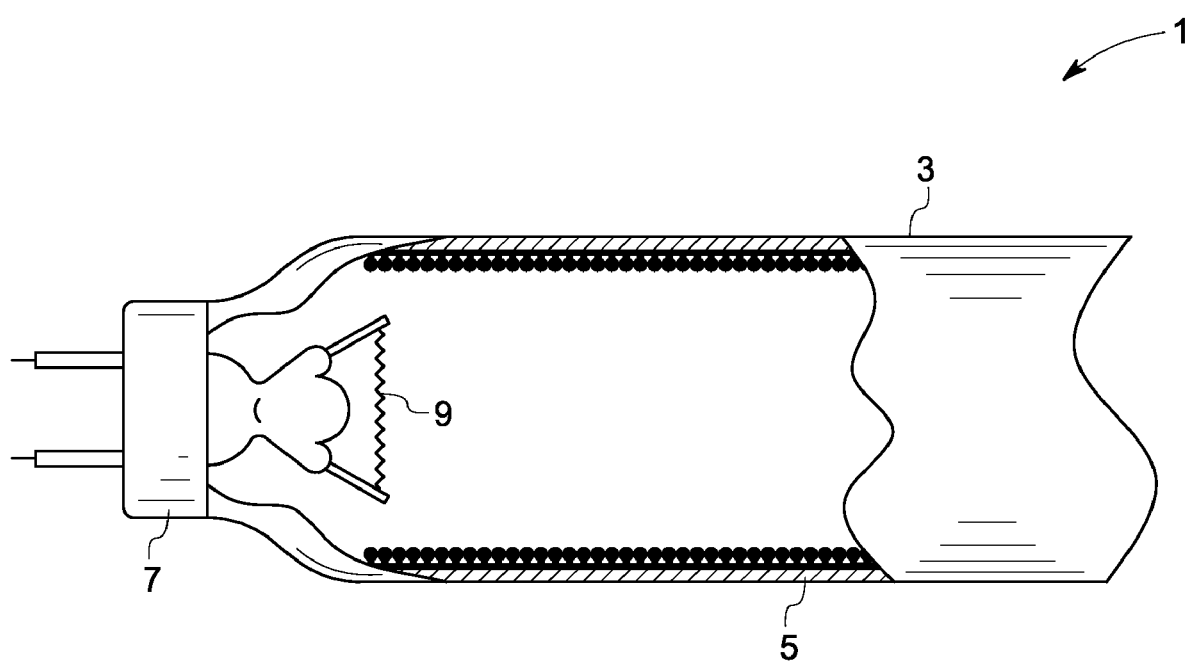
FIG. 1 is a cross sectional view of a fluorescent lamp according to one embodiment of the invention.

The phosphor may be placed into the lighting apparatus, such as a fluorescent lamp 1 illustrated in FIG. 1 or any other system where the phosphor is desirable, such as light emitting diode (LED) and a plasma display. Preferably, a suspension of the phosphor powder and a solvent is used to coat the phosphor powder onto a surface of the lamp cover 3, preferably the inner surface, and allowed to dry to evaporate the solvent to form a phosphor coating 5. Any coating method, such as dip coating or spray coating, may be used to coat the suspension. The fluorescent lamp also preferably contains a lamp base 7 and at least one electrode, such as a cathode 9. Preferably the lamp 1 contains two electrodes. While a low pressure mercury lamp 1 is illustrated in FIG. 1, the phosphor may be used in any other type of lamp, such as a high pressure mercury lamp.

Other examples of lighting apparatus or devices include UV excitation devices, such as chromatic lamps, lamps for backlighting liquid crystal systems, plasma screens, xenon excitation lamps, devices for excitation by light-emitting diodes (LEDs), cathode ray tubes, plasma display devices, liquid crystal displays (LCD's), and UV excitation marking systems. These uses are meant to be merely exemplary and not exhaustive.

The luminescent material may include some additional phosphors, i.e. a blend of phosphors may be used in the lighting apparatus. Additional phosphors, such as green, red, orange, yellow and blue emitting phosphors can be used to provide a white light. Furthermore, some other phosphors may be used, e.g., those emitting throughout the visible spectrum region, at wavelengths substantially different from those of the phosphors described herein. These additional phosphors may be used in the blend to customize the white color of the resulting light, and to produce sources with improved light quality.

When the phosphor material includes a blend of two or more phosphors, the ratio of each of the individual phosphors in the phosphor blend may vary, depending on the characteristics of the desired light output. The relative proportions of the individual phosphors in the various phosphor blends may be adjusted, so that when their emissions are blended and employed in a lighting device, there is produced visible light of predetermined ccx and ccy values on the CIE (International Commission on Illumination) chromaticity diagram. As stated, a white light is preferably produced. This white light may, for instance, possess a ccx value in the range of about 0.25 to about 0.55, and a ccy value in the range of about 0.25 to about 0.55.

EXAMPLES

The examples that follow are merely illustrative, and should not be construed to be any sort of limitation on the scope of the claimed invention.

Lumen maintenance test (also referred to as "lamp test") were performed for fluorescent lamps utilizing compositions of aluminate phosphors as described in example 1 and example 2

Example 1

Synthesis of $(Ba,Eu,Pr)_{1.05}Mg_{1.1}Al_{10}O_{17.15}$ $(Ba_{1.05}Mg_{1.1}Al_{10}O_{17.15}:Eu^{2+}, Pr^{3+})$ $BaCO_3$: 31.7023 grams
$Pr_6O_{11}$: 0.1328 grams
$Eu_2O_3$: 3.0647 grams
MgO: 7.5368 grams
$Al_2O_3$: 86.7232 grams The above components (starting materials) were dry-blended with $ZrO_2$ media in a Nalgene bottle for about 6 hour. The blend or mixture was fired at about 1400° C./10 hours/1% $H_2$ in an covered alumina boat. This sintered mixture was re-blended and re fired at about 1400° C./10 hours/1% $H_2$ in an covered alumina boat.

Example 2

Synthesis of $(Ba,Eu,Sm)_{1.05}Mg_{1.1}Al_{10}O_{17.15}$ $(Ba_{1.05}Mg_{1.1}Al_{10}O_{17.15}:Eu^{2+}, Sm^{3+})$ $BaCO_3$: 29.6510 grams
$Sm_2O_3$: 0.1386 grams
$Eu_2O_3$: 2.8664 grams
MgO: 7.0492 grams
$Al_2O_3$: 81.1117 grams The phosphor composition of example 2 was prepared with the same synthesis procedure as used for example 1.

The results of Lumen maintenance test were compared to the results of a lamp prepared with commercially available aluminate phosphor $BaMgAl_{10}O_{17}:Eu^{2+}$. The comparative results are shown in FIG. 2A and FIG. 2B. When compared with the lamp having $BaMgAl_{10}O_{17}:Eu^{2+}$ composition, the present lamps showed improved performance in terms of lumen maintenance and efficacy.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A luminescent material comprising an aluminate phosphor of formula I:

$A_{1+x}Mg_{1+y}Al_{10+z}O_{17+x+y+1.5z}:Eu^{2+}, R^{3+}$, wherein $0 \leq x \leq 0.4, 0 \leq y \leq 1$ and $0 \leq z \leq 0.2$; and wherein A is chosen to be Ba; and W is a trivalent rare earth ion selected from the group consisting of Sm3+, Pr3+ and/or combinations thereof.

2. The luminescent material of claim 1, wherein mole fraction of europium ions ($Eu^{2+}$) ranges from about 0.05 to about 0.5.

3. The luminescent material of claim 1, wherein the aluminate phosphor further comprises manganese ions ($Mn^{2+}$).

4. The luminescent material of claim 3, wherein mole fraction of manganese ions ($Mn^{2+}$) is less than about 0.5.

5. The luminescent material of claim 1, wherein the trivalent rare earth ions are present in an amount ranging from about 50 ppm to 10,000 ppm.

6. The luminescent material of claim 5, wherein the trivalent rare earth ions are present in an amount ranging from about 2500 ppm to 7,000 ppm.

7. A luminescent material of claim 1, further comprises $LaMgAl_{11}O_{19}$ in an amount less than about 30 mole percent relative to the aluminate phosphor of formula I.

8. A luminescent material comprising an aluminate phosphor of formula II:

$(LaMgAl_{11}O_{19})_a(A_{1+x}Mg_{1+y}Al_{10+z}O_{17+x+y+1.5z})_{1-a}:Eu^{2+}, R^{3+}$ wherein $0 \leq a \leq 0.3$;
$0 \leq x \leq 0.4$;
$0 \leq y \leq 1$;
$0 \leq z \leq 0.2$, and wherein A is chosen to be Ba; and W is a trivalent rare earth ion selected from the group consisting of Sm3+, Pr3+ and/or combinations thereof.

9. The luminescent material of claim 8, wherein mole fraction of europium ions ($Eu^{2+}$) ranges from about 0.05 to about 0.5.

10. The luminescent material of claim 8, wherein the aluminate phosphor further comprises manganese ions ($Mn^{2+}$).

11. The luminescent material of claim 10, wherein mole fraction of manganese ions ($Mn^{2+}$) is less than about 0.5.

12. The luminescent material of claim 8, wherein the trivalent rare earth ions are present in an amount ranging from about 50 ppm to 10,000 ppm.

13. The luminescent material of claim 12, wherein the trivalent rare earth ions are present in an amount ranging from about 2500 ppm to 7,000 ppm.

14. The luminescent material of claim 1, further comprises an additional phosphor capable of emitting a lighting color selected from the group consisting of red, yellow, orange, blue and green emitting phosphors.

15. A lighting apparatus comprising:
a light source; and
a luminescent material radiationally coupled to the light source, and comprising an aluminate phosphor of formula $A_{1+x}Mg_{1+y}Al_{10+z}O_{17+x+y+1.5z}:Eu^{2+}, R^{3+}$,
wherein A is chosen to be Ba; and W is a trivalent rare earth ion selected from the group consisting of Sm3+, Pr3+ and/or combinations thereof.

16. The luminescent material of claim 15, wherein mole fraction of europium ions ($Eu^{2+}$) ranges from about 0.05 to about 0.5.

17. The luminescent material of claim 15, wherein the aluminate phosphor further comprises manganese ions ($Mn^{2+}$).

18. The luminescent material of claim 17, wherein mole fraction of manganese ions ($Mn^{2+}$) is less than about 0.5.

19. The luminescent material of claim 15, wherein the trivalent rare earth ions are present in an amount ranging from about 50 ppm to 10,000 ppm.

20. The luminescent material of claim 19, wherein the trivalent rare earth ions are present in an amount ranging from about 2500 ppm to 7,000 ppm.

21. The lighting apparatus of claim 15, is a linear fluorescent lamp or a compact fluorescent lamp.

22. A lighting apparatus comprising:
a light source; and
a luminescent material radiationally coupled to the light source and comprising an aluminate phosphor of formula: $BaMgAl_{10}O_{17}:Eu^{2+}, Sm^{3+}$.

23. A lighting apparatus comprising:
a light source; and
a luminescent material radiationally coupled to the light source and comprising an aluminate phosphor of formula: $BaMgAl_{10}O_{17}:Eu^{2+}, Pr^{3+}$.

24. A lighting apparatus comprising:
a light source; and
a luminescent material radiationally coupled to the light source and comprising an aluminate phosphor of formula: $BaMgAl_{10}O_{17}:Eu^{2+}, Mn^{2+}, Sm^{3+}$.

25. A lighting apparatus comprising:
a light source; and
a luminescent material radiationally coupled to the light source and comprising an aluminate phosphor of formula: $BaMgAl_{10}O_{17}:Eu^{2+}, Mn^{2+}, Pr^{3+}$.

* * * * *